(12) United States Patent
Schepp et al.

(10) Patent No.: US 8,011,907 B2
(45) Date of Patent: Sep. 6, 2011

(54) PISTON PUMP WITH COMPACT RETENTION DEVICE FOR A RESTORING SPRING

(75) Inventors: Rene Schepp, Waiblingen (DE);
Wolfgang Schuller, Cleebronn (DE);
Juergen Reiner, Gestratz (DE)

(73) Assignee: Robert Bosch GmbH, Stuttgart (DE)

( * ) Notice: Subject to any disclaimer, the term of this patent is extended or adjusted under 35 U.S.C. 154(b) by 503 days.

(21) Appl. No.: 11/658,253

(22) PCT Filed: Jul. 14, 2005

(86) PCT No.: PCT/EP2005/053373
§ 371 (c)(1),
(2), (4) Date: Jan. 24, 2007

(87) PCT Pub. No.: WO2006/013142
PCT Pub. Date: Feb. 9, 2006

(65) Prior Publication Data
US 2008/0307955 A1      Dec. 18, 2008

(30) Foreign Application Priority Data

Jul. 30, 2004   (DE) .......................... 10 2004 037 147

(51) Int. Cl.
*F04B 39/10* (2006.01)
*F04B 53/12* (2006.01)
(52) U.S. Cl. ........ 417/549; 417/470; 417/471; 417/569; 92/135

(58) Field of Classification Search .................. 417/549, 417/470, 471, 569, 545, 552, 443, 444, 514; 92/135, 183; 137/454.4; 277/459, 460
See application file for complete search history.

(56) References Cited

U.S. PATENT DOCUMENTS

| 2,709,118 A | * | 5/1955 | Martin ........................ 277/436 |
| 2,715,555 A | * | 8/1955 | Marien ........................ 277/460 |
| 2,844,422 A | * | 7/1958 | Wankel ........................ 277/436 |
| 3,554,568 A | * | 1/1971 | Heid, Jr. ........................ 277/452 |
| 5,131,818 A | * | 7/1992 | Wittkop et al. ................ 417/273 |
| 5,642,694 A | * | 7/1997 | Dura et al. .................. 123/90.43 |
| 6,276,909 B1 | * | 8/2001 | Siegel et al. .................. 417/549 |
| 6,341,950 B1 | * | 1/2002 | Schuller et al. ............... 417/554 |
| 2001/0048884 A1 | * | 12/2001 | Siegel et al. .................. 417/470 |
| 2003/0138333 A1 | | 7/2003 | Nakazawa |
| 2004/0234400 A1 | * | 11/2004 | Schepp et al. ................ 417/471 |

FOREIGN PATENT DOCUMENTS

| DE | 102 29 201 A1 | 1/2003 |
| DE | 103 10 169 A1 | 10/2003 |
| WO | WO 2004/028878 A1 | 4/2004 |

OTHER PUBLICATIONS

Machine Translated Version of WO03004872.*

* cited by examiner

*Primary Examiner* — Charles G Freay
*Assistant Examiner* — Christopher Bobish
(74) *Attorney, Agent, or Firm* — Ronald E. Greigg

(57) ABSTRACT

A piston pump having a retaining device for retaining a spring element for restoring a closing element of a valve; the retaining device includes a receiving region for receiving and bracing the spring element and an integrally formed sealing region, in order to seal off a pressure chamber from a low-pressure region of the piston pump.

8 Claims, 2 Drawing Sheets

PISTON PUMP WITH COMPACT RETENTION DEVICE FOR A RESTORING SPRING

CROSS-REFERENCE TO RELATED APPLICATION

This application is a 35 USC 371 application of PCT/EP 2005/053373 filed on Jul. 14, 2005.

BACKGROUND OF THE INVENTION

1. Field of the Invention

The present invention relates to a piston pump having a retaining device for retaining a spring element for restoring a closing element of a valve.

2. Description of the Prior Art

Piston pumps in various embodiments are known from the prior art. As piston pumps for vehicle brake systems, radial piston pumps are often used, in which at least one piston is movable back and forth by means of an eccentric element. Such piston pumps are often also used for electronic stability systems (ESP) or electrohydraulic brake systems (EHB). The known piston pumps, between an inlet valve and an outlet valve, have a work chamber or pressure chamber, in which a pressure is built up by the motion of the piston. This pressure chamber must be sealed off on its end toward the piston from a low-pressure region; this is often accomplished with piston rings or sealing elements mounted in the cylinder. An inlet valve is also disposed in the pressure chamber. This kind of construction requires many individual parts and makes for relatively complicated and expensive assembly.

SUMMARY AND ADVANTAGES OF THE INVENTION

The piston pump of the invention, with a retaining device for retaining a spring element has the advantage over the prior art that it has a markedly reduced number of components. Moreover, the piston pump of the invention can be assembled especially simply. In particular, the retaining device of the invention includes a receiving region for receiving and bracing a spring element for restoring a valve closing element and also includes a sealing region that is embodied integrally on the retaining device. Thus the retaining device includes both the function of retaining the restoring element for the valve and the function of sealing off the pressure chamber from a low-pressure region. According to the invention, assembly of the piston pump can thus in particular be simplified markedly.

Preferably, the sealing region of the retaining devices is essentially annular and enables sealing in both the radial and the axial direction.

Also preferably, the retaining device for retaining the spring element includes at least one through opening, for delivering fluid from the pressure chamber to an inside of the sealing region. This makes it possible for the fluid, located under pressure in the pressure chamber, also to be present on the inside of the sealing region, thus making improved sealing possible, particularly in the radial direction, since the fluid that is under pressure presses the sealing region of the retaining device against a sealing face.

The retaining device preferably includes a central recess for at least partly receiving a face end, oriented toward the pressure chamber, of the piston. The face end of the piston is preferably embodied with a stepped region, so that the retaining device is fitted onto the face end of the piston and surrounds the end of the piston. This embodiment has especially great advantages in assembly, since the piston can be preassembled together with an inlet valve and the retaining device and finally be introduced, moving only in addition a piston restoring spring, into a cylinder of the piston pump.

To reduce the number of parts in the piston pump of the invention still further, the retaining device preferably additionally includes a fixation device for fixing a restoring element for the piston. The fixation device is especially preferably an encompassing groovelike indentation, which receives one end of the restoring element. The restoring element is preferably a cylindrical helical spring. As a result, it can be made possible for the last winding of the helical spring to be received in the groovelike indentation. The fixation device is also preferably disposed on the sealing region in such a way that the restoring force of the restoring element additionally presses the sealing region against the sealing faces. Improved sealing can be attained as a result.

Especially preferably, the retaining device is formed for holding a spring element made of a plastic material, in particular a thermoplastic. The materials known as PA66 or PEEK can for instance be used.

The piston pump of the invention is especially preferably used in brake systems of vehicles, for instance for controlling and regulating a pressure in a wheel brake cylinder. Especially preferably, the piston pump of the invention is used in conjunction with electronic control and regulating systems of the brake system, such as ESP, EHB, ATC, and so forth. On the one hand, major cost advantages can be attained as a result, and on the other, the combined retaining and sealing device of the invention makes improved sealing of the pressure chamber of the piston pump possible, so that the brake systems can be operated at higher pressures without necessitating cost increases for the desired higher operating pressure.

DRAWINGS BRIEF DESCRIPTION OF THE DRAWINGS

The invention is described in detail below, in terms of a preferred exemplary embodiment, in conjunction with the drawings, in which.

DESCRIPTION OF THE PREFERRED EMBODIMENT

Figure 1:
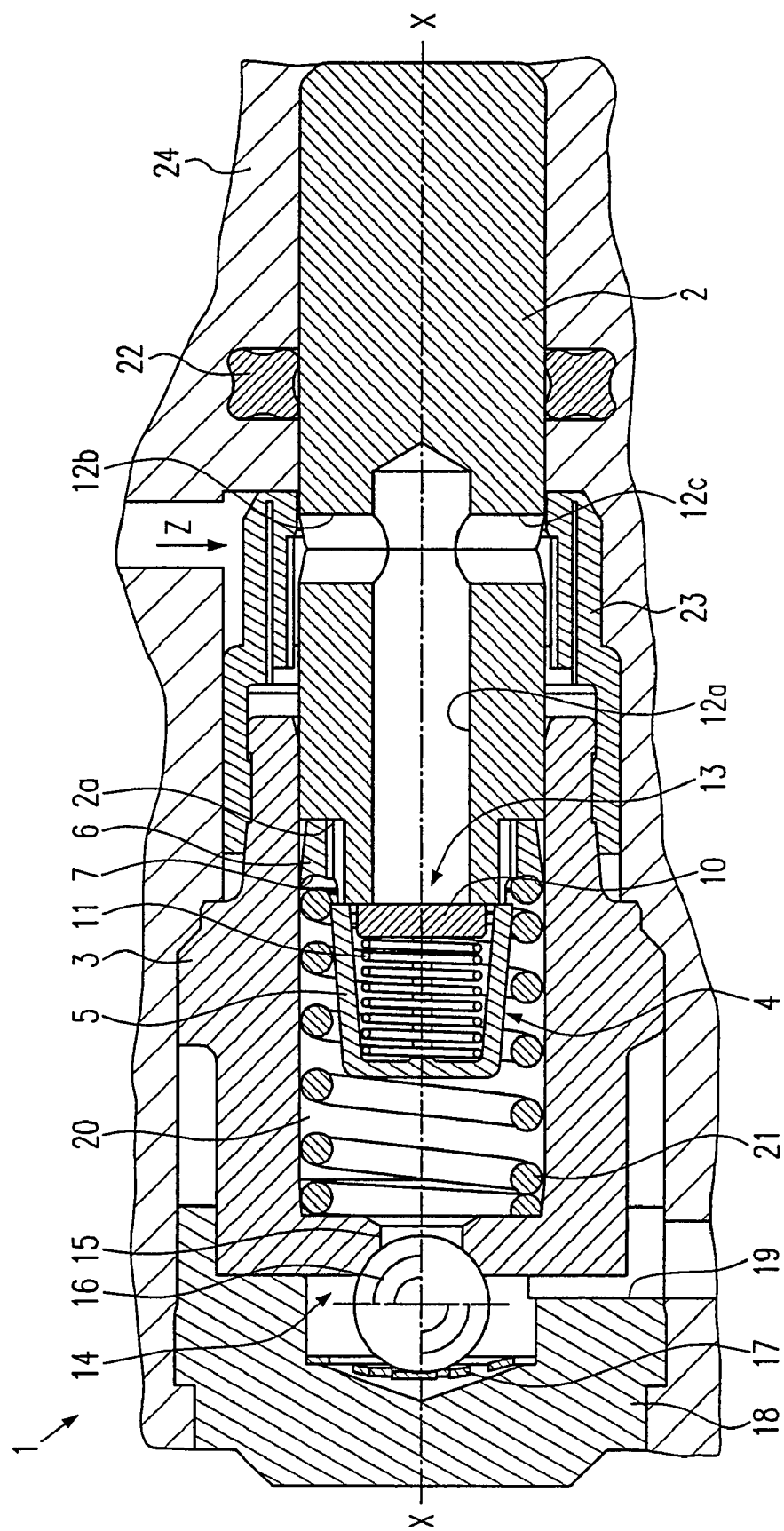
FIG. 1 is a schematic sectional view of a piston pump with a retaining device, in the first exemplary embodiment of the present invention.

FIG. 1 shows the construction of a pump element of the piston pump 1. A piston 2 is disposed, movably back and forth in the axial direction X-X, in a cylinder element 3. The piston 2 is moved for instance by means of an eccentric element. In the interior of the cylinder element 3, a pressure chamber 20 is provided, which is located between an inlet valve 13 and an outlet valve 14. As can be seen from FIG. 1, the inlet valve 13 is located in the interior of the pressure chamber 20, and the outlet valve 14 is embodied as a check valve, which opens and closes a through opening 15. The outlet valve 14 includes a ball 16 and a diaphragm spring 17, which is braced on a closure element 18. The closure element closes a stepped bore, which is provided in the housing of the piston pump and in which the pump element is located. The inlet valve 13 includes a closing element 10 in the form of a disklike plate, an inlet valve spring 11, and a retaining device 4.

A delivery of hydraulic fluid to the pressure chamber 20 is made through bores 12a, 12b and 12c provided in the piston 2. The hydraulic fluid is delivered in the direction of the arrow Z from a supply line through a filter 23 into the transverse bores 12b and 12c and, via the longitudinal bore 12a, is delivered into the pressure chamber 20 when the inlet valve 13 is open. A seal 22 on the side toward the eccentric element is also disposed in the housing 24.

A cylindrical helical spring 21, which furnishes a restoring force for restoring the piston 2, is also located in the pressure chamber 20. Hydraulically downstream of the outlet valve 14 is a pressure line 19, which delivers the hydraulic fluid, which is under pressure, for instance to wheel brake cylinders of a brake system of a vehicle.

The retaining device 4 for retaining the inlet valve spring 11 is shown in detail in FIGS. 3, 4, 5 and 6. As can be seen particularly from FIGS. 4 and 5, the retaining device 4 includes a receiving region 5 and a sealing region 6. The receiving region 5 serves to receive the inlet valve spring element 11 and has a substantially cup-shaped, cagelike construction. More precisely, the receiving region 5 includes four bar-like elements 5a, 5b, 5c and 5d, which form the receiving region 5. As can be seen from FIG. 1, the inlet valve spring 11 is braced particularly on the cross-shaped bottom region of the receiving region 5.

The sealing region 6 is formed integrally with the receiving region 5 and has a primary sealing face 6a and a secondary sealing face 6b. The primary sealing face 6a furnishes sealing off of the pressure chamber axially from the low-pressure region of the piston pump 1, and the secondary sealing face 6b furnishes sealing in the radial direction at a step 2a on the face end of the piston 2.

The primary sealing face 6a is embodied such that it is positioned obliquely to a cylinder wall of the cylinder element 3, so that the sealing edge K is formed on the end of the sealing region 6 oriented toward the pressure chamber 20.

An encompassing fixation groove 7 is also formed on the retaining device 4 and serves to position the piston restoring spring 21. The fixation groove 7 has a substantially semicircular shape in cross section, with a radius that is approximately equal to a radius of the spring material comprising the restoring spring 21 of the piston. As shown particularly in FIGS. 3 and 6, four through openings 8 are also provided, to enable hydraulic fluid from the pressure chamber 20 to be present on an inside 6c of the sealing region 6 as well. For fixation of the face-end region of the piston 2, protruding regions 9 (see FIG. 5) are also provided on the inside of the sealing region 6 of the retaining device 4. A press fit, for instance, may then be realized between the retaining device 4 and the steplike region of the piston 2. As a result, it becomes possible for the retaining device 4, with the inlet valve 13, to be preassembled on the face end of the piston 2, thus making it markedly simpler to put together the piston pump of the invention.

The mode of operation of the piston pump 1 will now be described. Once the piston 2 has changed its direction of motion at top dead center, the intake phase begins. In the intake phase, hydraulic fluid is aspirated into the pressure chamber 20 via the bores 12a, 12b and 12c through the opened inlet valve 13. Once the piston 2 has reached bottom dead center and the direction of piston motion reverses again, the inlet valve 13 is closed. Since the pressure in the pressure line 19 at that time is still higher than in the pressure chamber 20, the outlet valve 14 also remains closed. As a result of the motion of the piston 2 in the direction of its top dead center, pressure is built up in the pressure chamber 20. As soon as the pressure in the pressure chamber 20 becomes greater than the pressure in the pressure line 19, the outlet valve opens, and hydraulic fluid under pressure flows through the through bore 15 out of the pressure chamber 20 into the pressure line 19.

During the operation of the piston pump, sealing between the pressure chamber 20 and the low-pressure region (in FIG. 1, in the region of the filter 23) must be assured. This is attained by means of the integral sealing region 6 of the retaining device 4. As seen particularly from FIGS. 2, 4 and 5, the encompassing sealing edge K is constantly in contact with the cylindrical inside surface of the cylinder element 3. Since a pressure difference between the pressure chamber 20 and the low-pressure region becomes constantly greater during the pressure buildup in the pressure chamber 20, the sealing element must remain tight during this phase of operation.

The foregoing relates to a preferred exemplary embodiment of the invention, it being understood that other variants and embodiments thereof are possible within the spirit and scope of the invention, the latter being defined by the appended claims.

Figure 2:
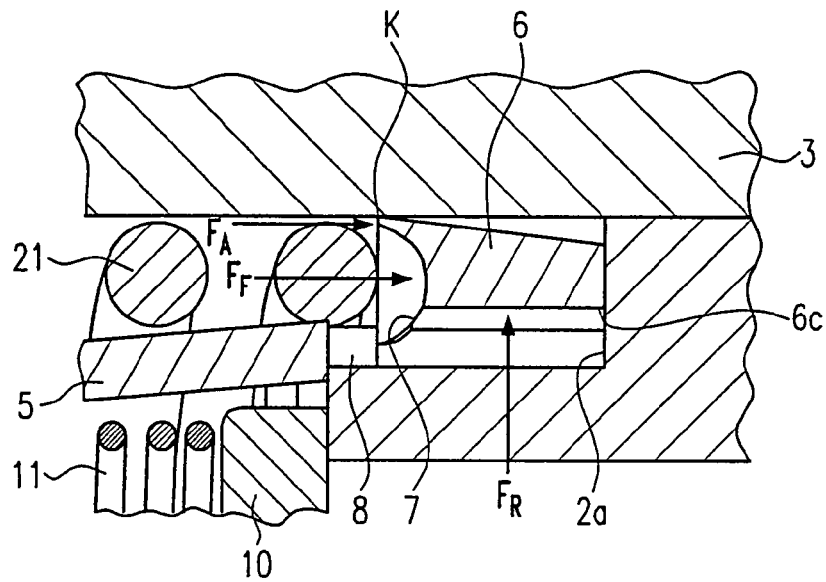
FIG. 2 is an enlarged fragmentary view in section of the piston pump shown in FIG. 1.
Figure 3:
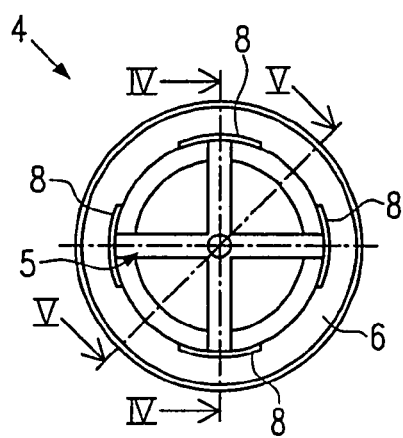
FIG. 3 is a schematic view of the retaining device of the invention from below.
Figure 4:
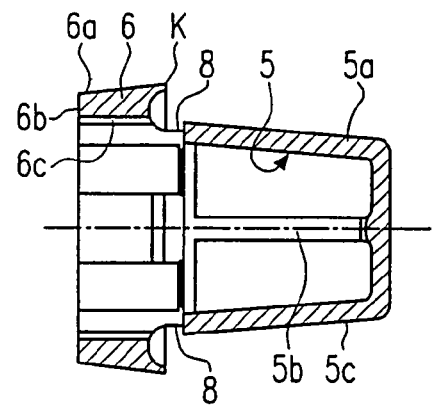
FIG. 4 is a sectional view taken along the line IV-IV of FIG. 3.
Figure 6:
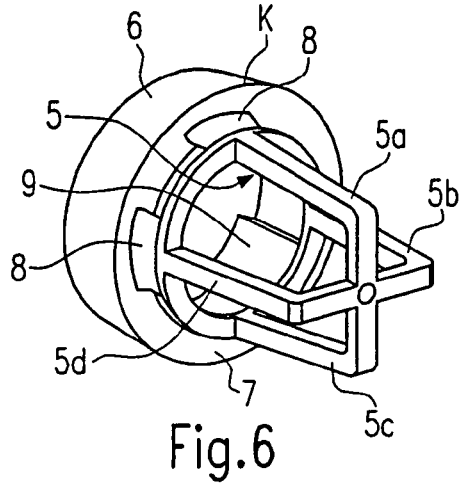
FIG. 6 is a perspective view of the retaining device of the invention.
Figure 5:
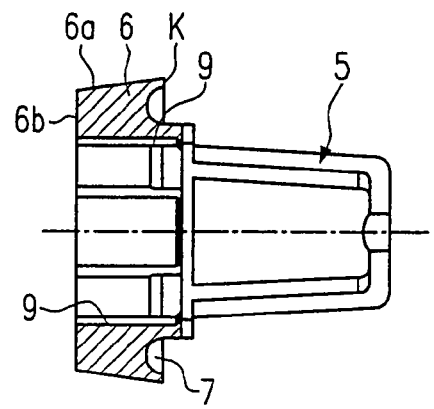
FIG. 5 is a sectional view taken along the line V-V of FIG. 3.

However, since the hydraulic fluid located in the pressure chamber 20 is also present, through the openings 8, on the inside circumference of the sealing region 6, with increasing pressure in the pressure chamber 20 a radial force $F_R$, exerted by the hydraulic fluid and shown in FIG. 2, also increases. The arrow $F_A$ represents an axial force which acts on the sealing region 6 as a result of the hydraulic pressure in the pressure chamber 20. Since a restoring force $F_F$ of the piston restoring spring 21 also increases constantly with a constant approach of the piston 2 to its top dead center, the sealing at the primary sealing face 6a can be improved at the sealing edge K by means of the radial force $F_R$. As can also be seen particularly from FIG. 2, a smaller component of a radial force can additionally be obtained by means of the hydraulic fluid present in the fixation groove 7 in the region of the sealing edge K. Excellent sealing is also attained at the secondary sealing face 6b, since the axial force $F_A$ acting from the pressure chamber 20 and the restoring force $F_F$ of the piston restoring spring 21 act on the sealing region 6 in the axial direction (see FIG. 2).

The retaining device 4 of the invention thus, besides the retaining function for retaining the inlet valve spring 11, also has a sealing function for sealing the pressure chamber 20 off from the low-pressure region of the piston pump. As a result, on the one hand, the number of parts of the piston pump can be reduced, and at the same time improved sealing of the pressure chamber 20 can be attained, since the pressure from the pressure chamber 20 also exerts an additional radial force $F_R$ on the sealing region 6. Moreover, the retaining device 4 of the invention has advantages in terms of assembly, since the retaining device 4 can be preassembled, together with the inlet valve 13, on the face end of the piston 2, or more precisely on the step 2a of the piston. To that end, protruding regions 9 on the inside of the sealing region 6 are provided on the retaining device 4 and furnish connections by frictional engagement between the retaining device 4 and the piston 2. The assembly can be done in a simplified way by placing the inlet valve spring 11 and the closing element 10 in the cage-like receiving region 5 of the retaining device 4 and then simply fitting the retaining device 4 onto the face end of the piston 2. Thus according to the invention, great advantages in terms of reducing assembly costs can be attained, and furthermore the risk of mistakes in assembly can be reduced still further.

It should also be noted that the secondary sealing face 66 need not, as shown in the exemplary embodiment, be embodied as a disklike, straight sealing face; instead, the secondary sealing face 6b may be rounded, so that an essentially linear sealing is obtained between the step 2a and the secondary sealing face 6b. As a result, the sealing region 6 can even enable a certain center offset, which could be caused by slight tilting of the piston in operation, without causing leakage problems.

The invention claimed is:

1. A piston pump comprising a piston, a pressure chamber, a low-pressure region, and a retaining device for retaining a spring element which is designed for restoring a closing element of a valve, the retaining device including a receiving region for receiving and bracing the spring element and an integrally formed sealing region which is in sliding engagement with a surface of the pressure chamber, the retaining device thus sealing off the pressure chamber from the low-pressure region of the piston pump, wherein the sealing region is embodied essentially annularly and enables sealing between the pressure chamber of the pump and the low-pressure region of the pump in the radial direction and the axial direction, and wherein the sealing region includes an annular pressure chamber between the piston and the retaining device, and wherein fluid pressure in the annular pressure chamber increases the sealing in the radial direction, wherein the retaining device includes at least one through opening which connects the inside of the retaining device directly to the annular pressure chamber of the sealing region so that fluid from the pressure chamber of the pump is delivered directly to the annular pressure chamber of the sealing region.

2. The piston pump as defined by claim 1, wherein the retaining device comprises a fixation device for fixing a restoring element for the piston.

3. The piston pump as defined by claim 1, wherein an end, toward the pressure chamber, of the piston has a stepped region, and the retaining device is secured to the stepped region.

4. The piston pump as defined by claim 2, wherein an end, toward the pressure chamber, of the piston has a stepped region, and the retaining device is secured to the stepped region.

5. The piston pump as defined by claim 2, wherein the fixation device is disposed in the sealing region of the retaining device such that a restoring force (FF) of the restoring element acts on the sealing region in the axial direction.

6. The piston pump as defined by claim 1, wherein the retaining device is made from a thermoplastic material.

7. The piston pump as defined by claim 6, wherein the retaining device is made from PEEK or PA66.

8. A brake system or stability system for a vehicle, including a piston pump as defined by claim 1.

\* \* \* \* \*